US012639311B2

(12) United States Patent
 Srivastava et al.

(10) Patent No.: US 12,639,311 B2
(45) Date of Patent: May 26, 2026

(54) SYSTEM AND METHOD FOR ACCESSING DATA ACROSS MULTIPLE DATA SOURCES IN A DATA ECOSYSTEM

(71) Applicant: JIO PLATFORMS LIMITED, Ahmedabad (IN)

(72) Inventors: Shikhar Srivastava, Bangalore (IN); Raghuram Velega, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 90 days.

(21) Appl. No.: 18/506,856

(22) Filed: Nov. 10, 2023

(65) Prior Publication Data

US 2024/0160629 A1 May 16, 2024

(30) Foreign Application Priority Data

Nov. 11, 2022 (IN) .............................. 202221064463

(51) Int. Cl.
*G06F 16/2453* (2019.01)
(52) U.S. Cl.
CPC .............................. *G06F 16/24545* (2019.01)
(58) Field of Classification Search
None
See application file for complete search history.

(56) References Cited

U.S. PATENT DOCUMENTS

| | | | | |
|---|---|---|---|---|
| 2012/0159180 A1* | 6/2012 | Chase | ................... | H04L 9/0869 |
| | | | | 713/184 |
| 2020/0279003 A1* | 9/2020 | Dupont | ............... | G06F 16/1744 |
| 2020/0357483 A1* | 11/2020 | Roquet | .................. | G16B 50/50 |
| 2021/0406740 A1* | 12/2021 | Patel | ...................... | G06N 5/048 |
| 2023/0058158 A1* | 2/2023 | Wienke | .................. | G06Q 40/08 |
| 2024/0171554 A1* | 5/2024 | Honna | ................... | G06N 3/042 |

* cited by examiner

*Primary Examiner* — Christopher J Raab
(74) *Attorney, Agent, or Firm* — FINNEGAN, HENDERSON, FARABOW, GARRETT & DUNNER, LLP

(57) ABSTRACT

The present disclosure provides a system (110) and a method for accessing datasets across data sources. The system (110) receives, from a user device (104), a query to fetch at least one dataset from at least one data source of a data lake (150). The system (110) sends a list including a plurality of parameters to the user device (104) and receives datasets of interest and a query pattern defined based on a user requirement from the user device (104), predicts an estimated cost for the datasets of interest, and identifies an optimal data source corresponding to the datasets of interest. The system (110) sends the estimated cost to the user device (104), pre-processes the optimal data source, and provides access to the user device (104) to fetch the datasets of interest from the optimal data source based on a positive response being received from the user device (104).

16 Claims, 10 Drawing Sheets

100A

100C

100D

100E

SYSTEM AND METHOD FOR ACCESSING DATA ACROSS MULTIPLE DATA SOURCES IN A DATA ECOSYSTEM

RESERVATION OF RIGHTS

FIELD OF INVENTION

The embodiments of the present disclosure generally relate to a field of wireless communication, and specifically to a system and a method for accessing data across multiple data sources in a data ecosystem.

BACKGROUND OF INVENTION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

An application programming interface (API) is commonly used by two or more computer systems to communicate with each other. The computer systems agree on a standard (called an API specification) and internally invoke calls that make up the API (known as subroutines, methods, requests, or endpoints). The term API may refer either to the specification or to the implementation. APIs may allow software developers to abstract away its internal implementation while exposing only relevant details, and provide consistent behaviour to other systems that are interacted with by the API.

There exist different types of APIs, one such API is a web API which allows interaction between the computer systems connected over internet via a Hypertext Transfer Protocol (HTTP). The web API may be used when a client system requests to query a server for a specific set of data from that server. Such type of API may also be referred to as a data access API.

In a typical big data ecosystem, which involves vast quantities of fast-moving datasets that are being streamed from disparate external sources, the datasets may be continuously ingested, transformed, and processed, and analytical insights stored in varied kinds of data stores such as in-memory key-value stores, a distributed memory grid, a data warehouse, NoSQL (not only Structured Query Language) databases, distributed search engines, and the like.

Conventional systems may support or provide a data access API platform supporting the big data ecosystem and data lakes. However, the conventional systems fail to serve the analytical insights to client applications and provide a uniform interface for clients to access data spread across varied kinds of data stores being used in the lake. This subsequently increases the client application development time to use data access APIs across different kinds of data stores in the lake.

In addition, the conventional systems fail to provide transparent information on the cost incurred to the client applications beforehand. Also, the conventional systems fail to provide a heuristic of defining a client query pattern (or use-case) based on well-defined attributes. Clients are usually unaware of the cost incurred until they actually consume the API and by that time, they are already charged heavily for large-scale computations (for example, central processing unit (CPU), memory, and disk), and data movement (for example, network bandwidth). This may also adversely affect the underlying lake storage as improper storage, and query pattern mapping may result in de-stabilizing the entire lake. Further, the conventional systems may not internally curate and customize a dataset footprint and storage based on the client use case.

There is, therefore, a need in the art to provide an improved system and a method to access data across multiple data sources in the big data ecosystem by overcoming the deficiencies of the prior art(s).

OBJECTS OF THE INVENTION

Some of the objects of the present disclosure, which at least one embodiment herein satisfies are listed herein below.

It is an object of the present disclosure to provide a system (for example, a uniform data access web Application Programming Interface (API) platform) and a method for accessing data or datasets across multiple data sources in a big data ecosystem.

It is an object of the present disclosure to provide a uniform data access web API platform for a big data ecosystem and a data lake with a standardized data response format.

It is an object of the present disclosure to provide a system and a method for serving high volume, near real-time, data insights spread across different kinds of data stores to clients in a uniform, data-store agnostic fashion with high concurrency requirements in a secured, metered and monitored manner.

It is an object of the present disclosure to provide a system that enables client applications to be transparently aware of the cost incurred, beforehand, in using the data access API, and gives them an opportunity to optimize the cost further, by providing a cost-optimal route in serving the data insights from a data lake.

It is an object of the present disclosure to provide a system that transparently communicates the cost incurred in fulfilling the client API requests to the clients based on dataset attributes and query pattern attributes.

It is an object of the present disclosure to provide a system that implements a least cost incurred strategy to reduce the incurred cost for the client.

It is an object of the present disclosure to provide a system that provides a cost optimal route to reduce the cost incurred for a client query pattern by internally curating and customizing dataset footprint and storage.

It is an object of the present disclosure to provide a system that improves stability of various data source services and a data lake as a whole.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system for accessing datasets across a plurality of data sources. The system includes a processor, and a memory operatively coupled to the processor, where the memory stores instructions to be executed by the processor. The processor is configured to receive, from a user device associated with a user, a query to fetch at least one dataset from at least one data source. In response to receiving the query, the processor sends a list including a plurality of parameters to the user device and receives datasets of interest identified from the list by the user and a query pattern defined based on a user requirement from the user device. The processor predicts an estimated cost for the datasets of interest, identifies an optimal data source based on the query pattern, and sends the estimated cost to the user device. The processor pre-processes the optimal data source and provides access to the user device to fetch the datasets of interest from the optimal data source based on a positive response being received from the user device.

In an embodiment, the plurality of parameters may include at least one of existing datasets, data sources corresponding to the existing datasets, and a plurality of attributes corresponding to the existing datasets.

In an embodiment, the plurality of attributes may include at least one of a size of each dataset, a volume of each dataset, recency of each dataset, a velocity of each dataset, and security associated with each dataset.

In an embodiment, the estimated cost may be directly proportional to an amount of one or more resources of the system. The one or more resources may include at least one of a Central Processing Unit (CPU), a Random-Access Memory (RAM), a disk, and a network bandwidth utilized in executing the query pattern.

In an embodiment, the optimal data source may be identified based on a least cost incurred method.

In an embodiment, the memory includes processor-executable instructions, which on execution, may cause the processor to migrate one or more datasets or slices of the one or more datasets from one data source to another optimal data source based on a cost incurred by the user.

In an embodiment, the memory includes processor-executable instructions, which on execution, may cause the processor to predict a new estimated cost in response to the migration, wherein the new estimated cost may include a cost for hosting the migration.

In an embodiment, the memory includes processor-executable instructions, which on execution, may cause the processor to stream large-scale data sets from the at least one data source to the user device based on the query pattern via a scalable data streaming Application Programming Interface (API).

In an embodiment, the processor may provide the access to the user device by being configured to receive an input associated with the query pattern from the user device, identify a location of the optimal data source based on the input, generate a token with a password based on the identified location, where the password may be encrypted using a symmetric key, and encode and send the token with the encrypted password to the user device to provide access to the user device.

In an embodiment, the memory includes processor-executable instructions, which on execution, may cause the processor to receive the encoded token with the encrypted password from the user device, decode the encoded token, and identify the location of the optimal data source based on the decoded token. The processor may read and decrypt the encrypted password using the symmetric key, and in response to decrypting the encrypted password, establish a connection between the optimal data source and the user device to stream the datasets of interest from the optimal data source to the user device.

In an aspect, the present disclosure relates to a method for accessing datasets across a plurality of data sources. The method includes receiving, by a processor associated with a system, from a user device associated with a user, a query to fetch at least one dataset from at least one data source. The method includes, in response to receiving the query, sending, by the processor, a list including a plurality of parameters to the user device and receiving datasets of interest identified from the list by the user and a query pattern defined based on a user requirement from the user device, predicting, by the processor, an estimated cost for the datasets of interest and identifying an optimal data source based on the query pattern, sending, by the processor, the estimated cost to the user device, and pre-processing, by the processor, the optimal data source and providing access to the user device to fetch the datasets of interest from the optimal data source based on a positive response being received from the user device.

In an embodiment, the estimated cost may be directly proportional to an amount of one or more resources of the system, wherein the one or more resources comprises at least one of a Central Processing Unit (CPU), a Random-Access Memory (RAM), a disk, and a network bandwidth utilized in executing the query pattern.

In an embodiment, the optimal data source may be identified based on a least cost incurred method.

In an embodiment, the method may include migrating, by the processor, one or more datasets or slices of the one or more datasets from one data source to another optimal data source based on a cost incurred by the user.

In an embodiment, the method may include predicting, by the processor, a new estimated cost in response to the migration, where the new estimated cost may include a cost for hosting the migration.

In an embodiment, the method may include streaming, by the processor, large-scale data sets from the at least one data source to the user device based on the query pattern via a scalable data streaming Application Programming Interface (API).

In an embodiment, providing access to the user device may include receiving, by the processor, an input associated with the query pattern from the user device, identifying, by the processor, a location of the optimal data source based on the input, generating, by the processor, a token with a password based on the identified location, where the password may be encrypted using a symmetric key, and encoding and sending, by the processor, the token with the encrypted password to the user device to provide access to the user device.

In an embodiment, the method may include receiving, by the processor, the encoded token with the encrypted password from the user device, decoding, by the processor, the encoded token and identifying the location of the optimal data source based on the decoded token, reading and decrypting, by the processor, the encrypted password using the symmetric key, and in response to decrypting the encrypted password, establishing, by the processor, a connection between the optimal data source and the user device to stream the datasets of interest from the optimal data source to the user device.

In an aspect, a user equipment (UE) includes a processor and a memory operatively coupled to the processor. The memory includes processor-executable instructions, which on execution, cause the processor to send a query to fetch at least one dataset from at least one data source of a data lake to a system, receive a list including a plurality of parameters from the system, identify datasets of interest from the list and define a query pattern based on a user requirement, send the query pattern to the system, receive an estimated cost for the datasets of interest from the system based on query pattern, and send a response to the system based on the estimated cost. The processor is communicatively coupled with the system, and the system is configured to send the list including the plurality of parameters to the UE in response to receiving the query, predict the estimated cost for the datasets of interest, identify an optimal data source based on the query pattern, and pre-process the optimal data source and provide access to the UE to fetch the datasets of interest from the optimal data source based on a positive response being received from the UE.

In an aspect, a non-transitory computer-readable medium comprising processor-executable instructions that cause a processor to receive, from a user device associated with a user, a query to fetch at least one dataset from at least one data source of a data lake. In response to receiving the query, the processor sends a list including a plurality of parameters to the user device and receive datasets of interest identified from the list by the user and a query pattern defined based on a user requirement from the user device, predict an estimated cost for the datasets of interest and identify an optimal data source based on the query pattern, send the estimated cost to the user device, pre-process the optimal data source, and provide access to the user device to fetch the datasets of interest from the optimal data source based on a positive response being received from the user device.

BRIEF DESCRIPTION OF DRAWINGS

The accompanying drawings, which are incorporated herein, and constitute a part of this disclosure, illustrate exemplary embodiments of the disclosed methods and systems which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes the disclosure of electrical components, electronic components, or circuitry commonly used to implement such components.

Figure 1A:
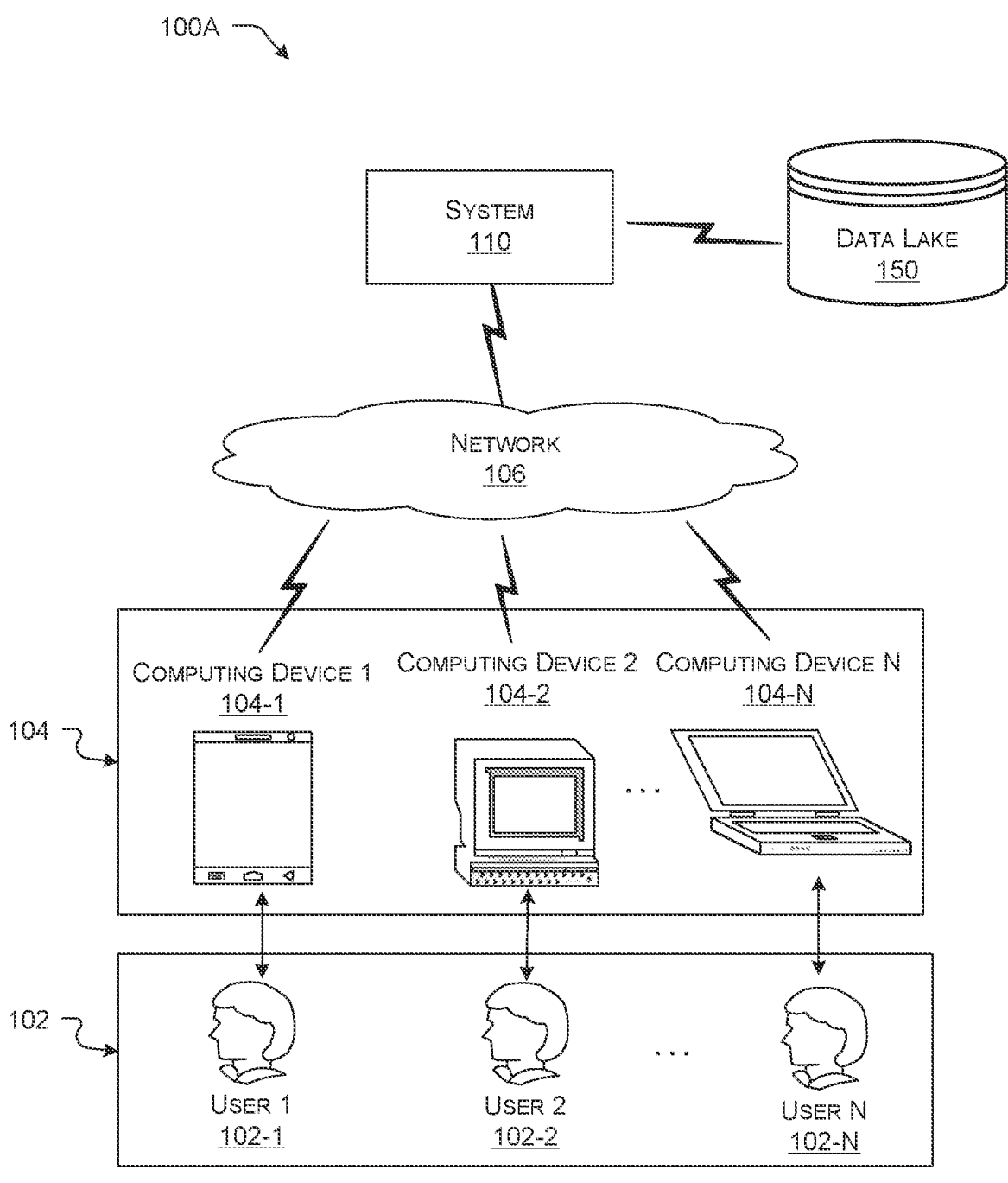
FIG. 1A illustrates an exemplary network architecture (100A) for implementing a proposed system, in accordance with an embodiment of the present disclosure.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

Also, it is noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive in a manner similar to the term "comprising" as an open transition word without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an", and "the" are intended to include the plural forms as well, unless the context indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present disclosure provides a system (for example, a uniform data access web Application Programming Interface (API) platform) and a method for accessing data or datasets across multiple data sources in a big data ecosystem. The system serves high volume, near real-time, data insights spread across different kinds of data stores to clients in a uniform, data-store agnostic fashion with high concurrency requirements in a secured, metered, and monitored manner. The system enables client applications to be transparently aware of cost incurred, beforehand, in using the data access API and gives them an opportunity to optimize the cost further, by providing a cost-optimal route in serving the data insights from a data lake. The cost optimal route reduces the cost incurred for a client query pattern by internally curating and customizing dataset footprint and storage. The system transparently communicates the cost incurred in fulfilling the client API requests to the clients based on dataset attributes and query pattern attributes. The system implements a least cost incurred strategy to reduce the incurred cost for the client. The system improves stability of various data source services and the data lake as a whole.

Various embodiments of the present disclosure will be explained in detail with reference to FIGS. 1-8.

FIG. 1A illustrates an exemplary network architecture (100A) for implementing a proposed system, in accordance with an embodiment of the present disclosure.

As illustrated in FIG. 1A, by way of example and not by not limitation, the exemplary network architecture (100A) may include a plurality of computing devices (104-1, 104-2 . . . 104-N), which may be individually referred as the computing device (104) and collectively referred as the computing devices (104). It may be appreciated that the computing device (104) may be interchangeably referred to as a user device, a client device, or a user equipment. The plurality of computing devices (104) may include, but not be limited to, scanners such as cameras, webcams, scanning units, and the like.

In an embodiment, the computing device (104) may include smart devices operating in a smart environment, for example, an Internet of Things (IoT) system. In such an embodiment, the computing device (104) may include, but is not limited to, smart phones, smart watches, smart sensors (e.g., mechanical, thermal, electrical, magnetic, etc.), networked appliances, networked peripheral devices, networked lighting system, communication devices, networked vehicle accessories, networked vehicular devices, smart accessories, tablets, smart television (TV), computers, smart security system, smart home system, other devices for monitoring or interacting with or for the users and/or entities, or any combination thereof.

A person of ordinary skill in the art will appreciate that the computing device, the user device, or the user equipment (104) may include, but is not limited to, intelligent, multi-sensing, network-connected devices, that can integrate seamlessly with each other and/or with a central server or a cloud-computing system or any other device that is network-connected.

In an embodiment, the user device or the user equipment (104) may include, but is not limited to, a handheld wireless communication device (e.g., a mobile phone, a smartphone, a phablet device, and so on), a wearable computer device (e.g., a head-mounted display computer device, a head-mounted camera device, a wristwatch computer device, and so on), a Global Positioning System (GPS) device, a laptop computer, a tablet computer, or another type of portable computer, a media playing device, a portable gaming system, and/or any other type of computer device with wireless communication capabilities, and the like. In an embodiment, the user equipment (104) may include, but is not limited to, any electrical, electronic, electromechanical, or an equipment, or a combination of one or more of the above devices such as virtual reality (VR) devices, augmented reality (AR) devices, laptop, a general-purpose computer, desktop, personal digital assistant, tablet computer, mainframe computer, or any other computing device, wherein the user equipment (104) may include one or more in-built or externally coupled accessories including, but not limited to, a visual aid device such as a camera, an audio aid, a microphone, a keyboard, and input devices for receiving input from the user or the entity such as touch pad, touch enabled screen, electronic pen, and the like.

A person of ordinary skill in the art will appreciate that the user equipment (104) may not be restricted to the mentioned devices and various other devices may be used.

In an exemplary embodiment, the user equipment (104) may communicate with the system (110) through a network (106). The network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network (106) may include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof.

Further, the network architecture (100A) may include a system (110) and a data lake (150). The data lake (150) may include a plurality of data sources (150a, 150b, . . . , 150n). Each of the data sources (150a, 150b, . . . , 150n) may include multiple datasets.

In an exemplary embodiment, the system (110) may be configured to receive, from the user device (104) associated with one or more users (102-1, 102-2 . . . 102-N), a query to fetch datasets from the data source of the data lake (150). In response to receiving the query, the system (110) may send a list including a plurality of parameters to the user device (104). The plurality of parameters may include, but not limited to, existing datasets, data sources corresponding to the existing datasets, and a plurality of attributes corresponding to the existing datasets. The plurality of attributes may include, but not limited to, a size of each dataset, a volume of each dataset, recency of each dataset, a velocity of each dataset, and security associated with each dataset.

In an embodiment, upon receiving the list, the user (102) may identify datasets of interest from the list and define a query pattern based on a user requirement or a user use case. The user (102) may send the datasets of interest identified from the list and the query pattern to the system (110).

In an embodiment, the system (110) may predict an estimated cost for the datasets of interest in advance. Further, the system (110) may identify an optimal data source for the datasets of interest from the data sources (150a, 150b, . . . , 150n) based on the query pattern. The system (110) may send the estimated cost to the user device (104).

In an embodiment, the user (102) may receive the estimated cost for the datasets of interest and send a response, for example, a positive response or a negative response, to the system (110) to gain access to the datasets of interest.

In an embodiment, upon receiving a positive response from the user device (104), the system (110) may pre-process the optimal data source and provide access to the user device (104) to fetch the datasets of interest from the optimal data source.

Although FIG. 1A shows exemplary components of the network architecture (100A), in other embodiments, the network architecture (100A) may include fewer components, different components, differently arranged components, or additional functional components than depicted in FIG. 1A. Additionally, or alternatively, one or more components of the network architecture (100A) may perform functions described as being performed by one or more other components of the network architecture (100A).

Figure 1B:
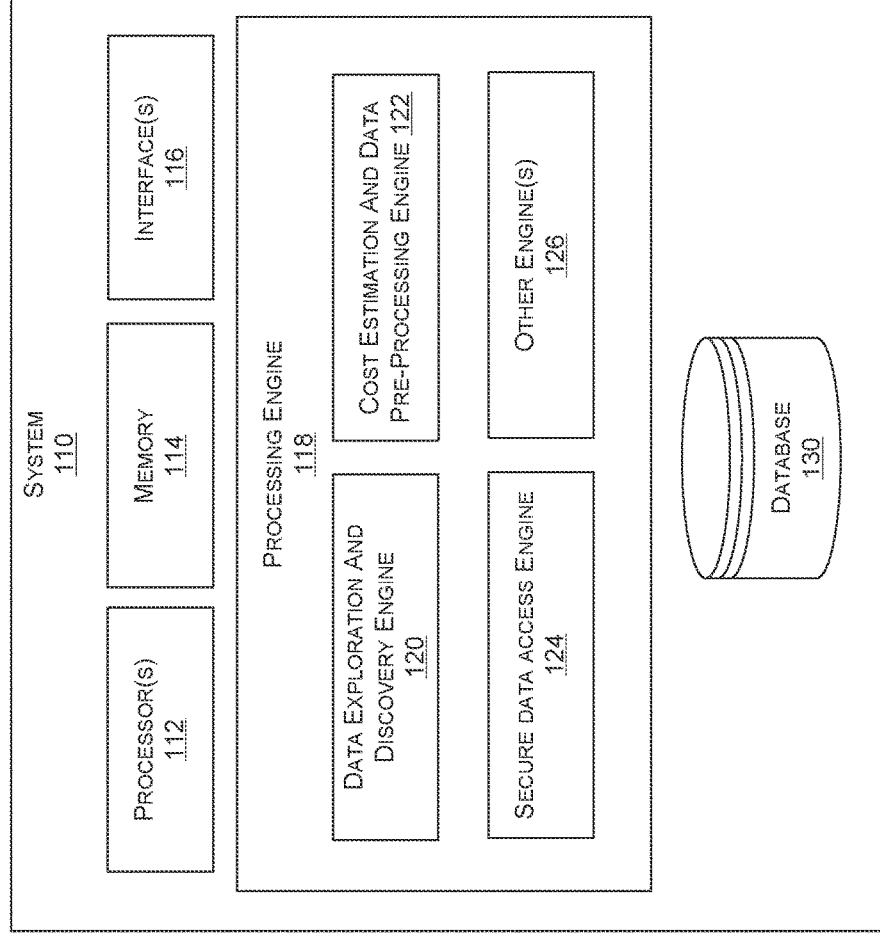
FIG. 1B illustrates an example block diagram (100B) of a system for accessing datasets from a plurality of data sources of a data lake, in accordance with an embodiment of the present disclosure.
Figure 1B:

FIG. 1B illustrates an exemplary block diagram (100B) of a system (110) for accessing datasets from a plurality of data sources of a data lake (150), in accordance with an embodiment of the present disclosure.

In an embodiment, and as shown in FIG. 1B, the system (110) may include one or more processors (112). The one or more processors (112) may be implemented as one or more microprocessors, microcomputers, microcontrollers, digital signal processors, central processing units, logic circuitries, and/or any devices that manipulate data based on operational instructions. Among other capabilities, the one or more processor(s) (112) may be configured to fetch and execute computer-readable instructions stored in a memory (114) of the system (110). The memory (114) may store one or more computer-readable instructions or routines, which may be fetched and executed to create or share the data units over a network service. The memory (114) may comprise any non-transitory storage device including, for example, volatile memory such as Random-Access Memory (RAM), or non-volatile memory such as Erasable Programmable Read-Only Memory (EPROM), flash memory, and the like.

In an embodiment, the system (110) may also include an interface(s) (116). The interface(s) (116) may comprise a variety of interfaces, for example, a variety of interfaces, for example, interfaces for data input and output devices, referred to as I/O devices, storage devices, and the like. The interface(s) (116) may facilitate communication of the system (110) with various devices coupled to it. The interface(s) (116) may also provide a communication pathway for one or more components of the system (110). Examples of such components include, but are not limited to, processing engine(s) (118) and a database (130).

In an embodiment, the processing engine(s) (118) may be implemented as a combination of hardware and programming (for example, programmable instructions) to implement one or more functionalities of the processing engine(s) (118). In examples, described herein, such combinations of hardware and programming may be implemented in several different ways. For example, the programming for the processing engine(s) (118) may be processor-executable instructions stored on a non-transitory machine-readable storage medium and the hardware for the one or more processors (112) may comprise a processing resource (for example, one or more processors), to execute such instructions. In the present examples, the machine-readable storage medium may store instructions that, when executed by the processing resource, implement the processing engine(s) (118). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (118) may be implemented by electronic circuitry.

In an embodiment, the database (130) may comprise data that may be either stored or generated as a result of functionalities implemented by any of the components of the processor(s) (112) or the processing engine(s) (118) or the system (110).

In an exemplary embodiment, the processing engine(s) (118) may include one or more engines selected from any of a data exploration and discovery engine (120), a cost estimation and pre-processing engine (122), a secure data access engine (124), and other units/engines (126). The other units/engines (126) may include, but are not limited to, a data acquisition engine, a monitoring engine, a notification engine, and the like.

In an embodiment, the processor (112) may, via the data exploration and discovery engine (120), receive a query from a user device (104) associated with a user (102). The query may be to fetch datasets from the data sources of a data lake (150).

In an embodiment, the processor (112) may, via the cost estimation and pre-processing engine (122), send a list including, without limitation, existing datasets, data sources corresponding to the existing datasets, and a plurality of attributes corresponding to the existing datasets to the user device (104) in response to receiving the query. The plurality of attributes may include, without limitation, a size of each dataset, a volume of each dataset, recency of each dataset, a velocity of each dataset, and security associated with each dataset. The user (102) may identify datasets of interest from the list and define a query pattern based on a user require-ment or user use case.

In an embodiment, the processor (112) may, via the cost estimation and pre-processing engine (122), receive the datasets of interest identified from the list and the query pattern. In an embodiment, the processor (112) may, via the cost estimation and pre-processing engine (122), predict an estimated cost and identify an optimal data source for the datasets of interest based on the query pattern. The optimal data source may be identified based on a least cost incurred method. The processor (112) may also, via the cost estima-tion and pre-processing engine (122), pre-process the opti-mal data source based on the query pattern. The estimated cost may be directly proportional to an amount of one or more resources of the system (110). The one or more resources may include, but not limited to, a Central Pro-cessing Unit (CPU), a Random-Access Memory (RAM), a disk, and a network bandwidth utilized in executing the query in the data sources corresponding to the existing datasets.

In an embodiment, the processor (112) may, via the secure data access engine (124), receive a response, for example, a positive response or a negative response, from the user (102). Based on the positive response being received from the user device (104), the processor (112) may, via the secure data access engine (124), provide access to the user device (104) to fetch the datasets of interest from the optimal data source.

In an embodiment, the processor (112) may, via the secure data access engine (124), receive input associated with the query from the user device (104), and identify a location of the optimal data source based on the input. The processor (112) may, via the secure data access engine (124), generate a token with a password in a relational database manage-ment system (RDBMS), where the password may be encrypted using a symmetric key. The processor (112) may, via the secure data access engine (124), encode and send the token with the encrypted password to the user device (104) to provide access to the user device (104).

In an embodiment, the processor (112) may, via the secure data access engine (124), receive the encoded token with the encrypted password from the user device (104). The pro-cessor (112) may, via the secure data access engine (124), decode the encoded token and identify the location of the optimal data source based on the decoded token. The pro-cessor (112) may, via the secure data access engine (124), read and decrypt the encrypted password using the symmet-ric key and establish a connection between the optimal data source and the user device (104) to stream the datasets of interest from the optimal data source to the user device (104) in a secured manner.

Although FIG. 1B shows exemplary components of the system (110), in other embodiments, the system (110) may include fewer components, different components, differently arranged components, or additional functional components than depicted in FIG. 1B. Additionally, or alternatively, one or more components of the system (110) may perform functions described as being performed by one or more other components of the system (110).

Figure 1C:
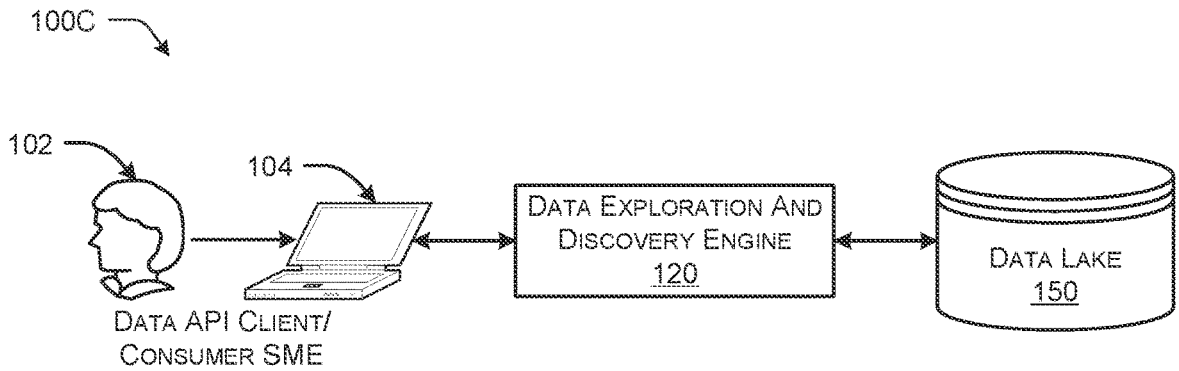
FIG. 1C illustrates a schematic representation (100C) depicting a data exploration and discovery phase of datasets access, in accordance with an embodiment of the present disclosure.

FIG. 1C illustrates a schematic representation (100C) depicting a data exploration and discovery phase of data access, in accordance with an embodiment of the present disclosure.

Referring to FIG. 1C, a client or a consumer or a user (102) may be associated with a computing device or a user device (104). The user (102) may understand existing data-sets or data products and properties associated with the datasets or the data products stored in a data lake (150) via a data exploration and discovery engine (120). In one embodiment, the user (102) may connect to the data explo-ration and discovery engine (120) via a user device (104). In one specific embodiment, the user (102) may be a data API client and the consumer may be a Subject Matter Expert (SME), who is usually an individual or a team with an in-depth understanding of specific use-case/problem to be solved in the data lake (150).

Figure 1D:
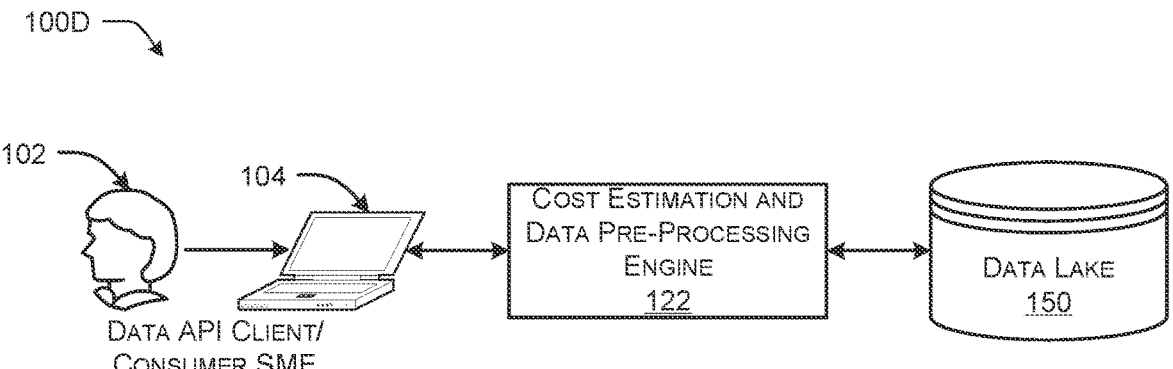
FIG. 1D illustrates a schematic representation (100D) depicting a cost-estimation and data-preprocessing phase of data access, in accordance with an embodiment of the present disclosure.

FIG. 1D illustrates a schematic representation (100D) depicting a cost-estimation and data pre-processing phase of data access, in accordance with an embodiment of the present disclosure.

Referring to FIG. 1D, a user (102) associated with a user device (104) may be connected to a cost-estimation and data pre-processing engine (122). The cost-estimation and data pre-processing engine (122) may be configured to identify datasets of interest of the user (102) and query pattern defined by the user (102) which may be associated to datasets or data products stored in the data lake (150). The cost-estimation and data pre-processing engine (122) may perform cost estimation against a cost-optimal data source based on a user's use case, identified datasets of interest, and the query pattern. The cost-estimation and data pre-process-ing engine (122) may provide the user (102) with an estimated cost incurred beforehand. The estimated cost may be directly proportional to an amount of one or more resources of the system (110). The one or more resources may include, but not limited to, a CPU, a Random-Access Memory (RAM), a disk, and a network bandwidth utilized in executing the query in the data sources corresponding to the existing datasets.

Figure 1E:
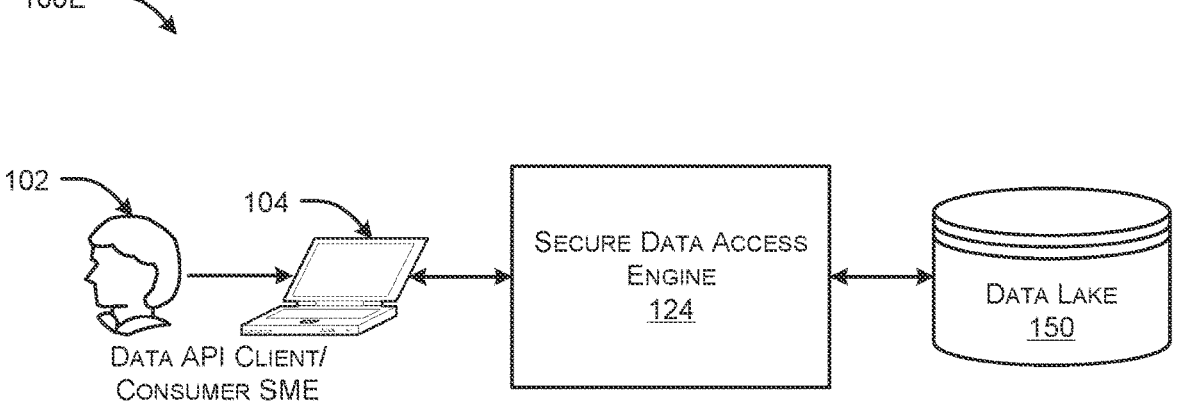
FIG. 1E illustrates a schematic representation (100E) depicting a secured data access phase, in accordance with an embodiment of the present disclosure.

FIG. 1E illustrates a schematic representation (100E) depicting a secured data access phase, in accordance with an embodiment of the present disclosure.

Referring to FIG. 1E, a secure data access engine (124) may be configured to enable the user (102) to securely access data across desperate data stores or data sources in a standard uniform way upon being agnostic of the data source from where it was served. The secure data access engine (124) may also be configured to allow a very large-scale database or datasets to be queried and returned in a micro-batched fashion utilizing minimum resources through a massively scalable data streaming capability.

In an embodiment, the secure data access engine (124) may also be configured to generate alerts and notifications which may always keep the user (102) completely aware of an API usage using rich metrics capture techniques and advanced monitoring techniques. The secure data access engine (124) may further be configured to stabilise anomalies in behaviour and address threats or attacks whilst providing operational stability.

Furthermore, in one embodiment, the data exploration and discovery phase and the cost-estimation and data pre-processing phase together may help the user (102) to understand the existing data-products and its corresponding properties present in the data lake (150). Both the phases may define the application use-case and may predict the estimated optimal cost incurred before initiating an actual data requests call, on the basis of optimal storage.

Further, as part of secured data access phase, the user (102) may be on-boarded by performing account creation, security token setup, wallet setup, and the like, and the data API requests and response may be served in a secured manner.

Figure 2:
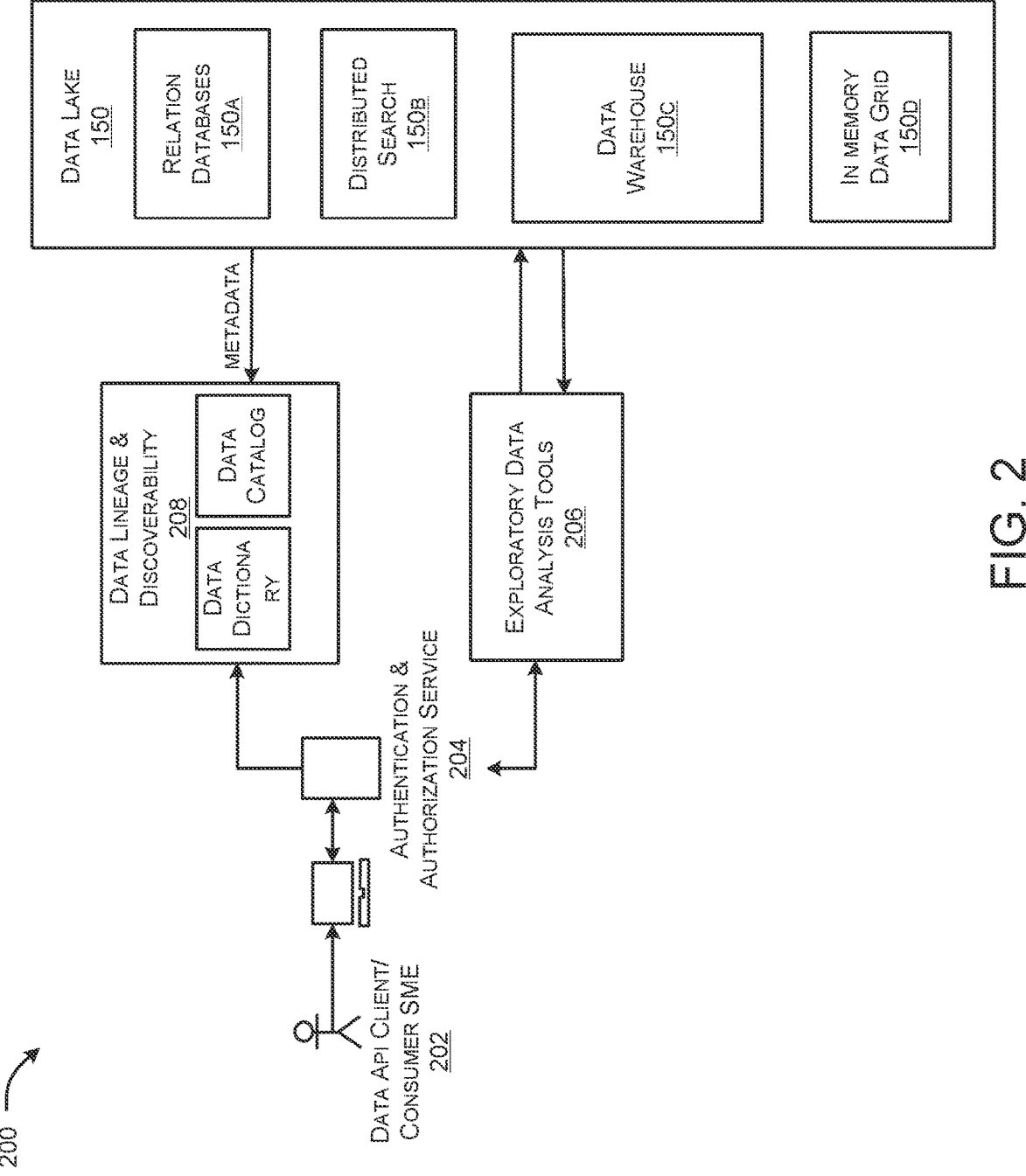
FIG. 2 illustrates an example block diagram (200) for implementing data exploration and discovery phase, in accordance with an embodiment of the present disclosure.

FIG. 2 illustrates an exemplary block diagram (200) for implementing the data exploration and discovery phase, in accordance with an embodiment of the present disclosure.

Referring to FIG. 2, the data exploration and discovery phase may be performed on a system (110), i.e., a data access API. Data cataloguing solutions and exploratory data analysis (EDA) toolkits (206) may be leveraged for identifying existing datasets or data products, respective data sources and attributes associated with the datasets or the data products. The attributes may be metadata around the stored datasets such as size of the datasets, volume of the datasets, recency of the datasets, velocity of the datasets, security of the datasets, or the like. The EDA toolkit (206) may enable a data API client (202) (for example, a user as shown in FIG. 1A) to identify the datasets of interest in a seamless, independent, and self-explanatory fashion and capture the necessary attributes for defining the use-case. The EDA toolkit (206) may enable the data API client (202) to define a query pattern. In one embodiment, the data cataloguing solutions may be used out of box or may be custom built.

In operation, the data API client (202) may go through authentication and authorization services in step 204. On successful authentication, data exploration and discovery may be initiated using data stored in the data lake (150) using the EDA toolkits (206) and data lineage and discoverability toolkits (208). The data lake (150) may include multiple databases, for example, but not limited to, a relation database (150a), a distributed search (150b), a data warehouse (150c), an in-memory data grid (150d), and the like. The data between the data lake (150) and the authentication process may be exchanged via the EDA toolkits (206) and the data lineage and discoverability toolkits (208).

Further, a configurable query pattern may be defined for the datasets of interest identified by the data API client (202). The data API client (202) may feed in configurable values defining a query pattern for the use-case they want to realize. The configurable values may include one or more of the following:

a. Data queries which may have to be executed along with their estimated total request count, b. For each of the queries, the estimated query request count may be broken down in different time-based buckets such as monthly, weekly, daily, hourly, minutes, seconds, or the like to capture request frequency, c. Estimated response data volume (output # records) for each request query scenario, and d. Estimated response data volume (output size in bytes assuming plaintext/string data type) for each request query scenario. The system (110) may capture how wide (# of columns in the RDBMS schema output) each record output can be.

Figure 3:
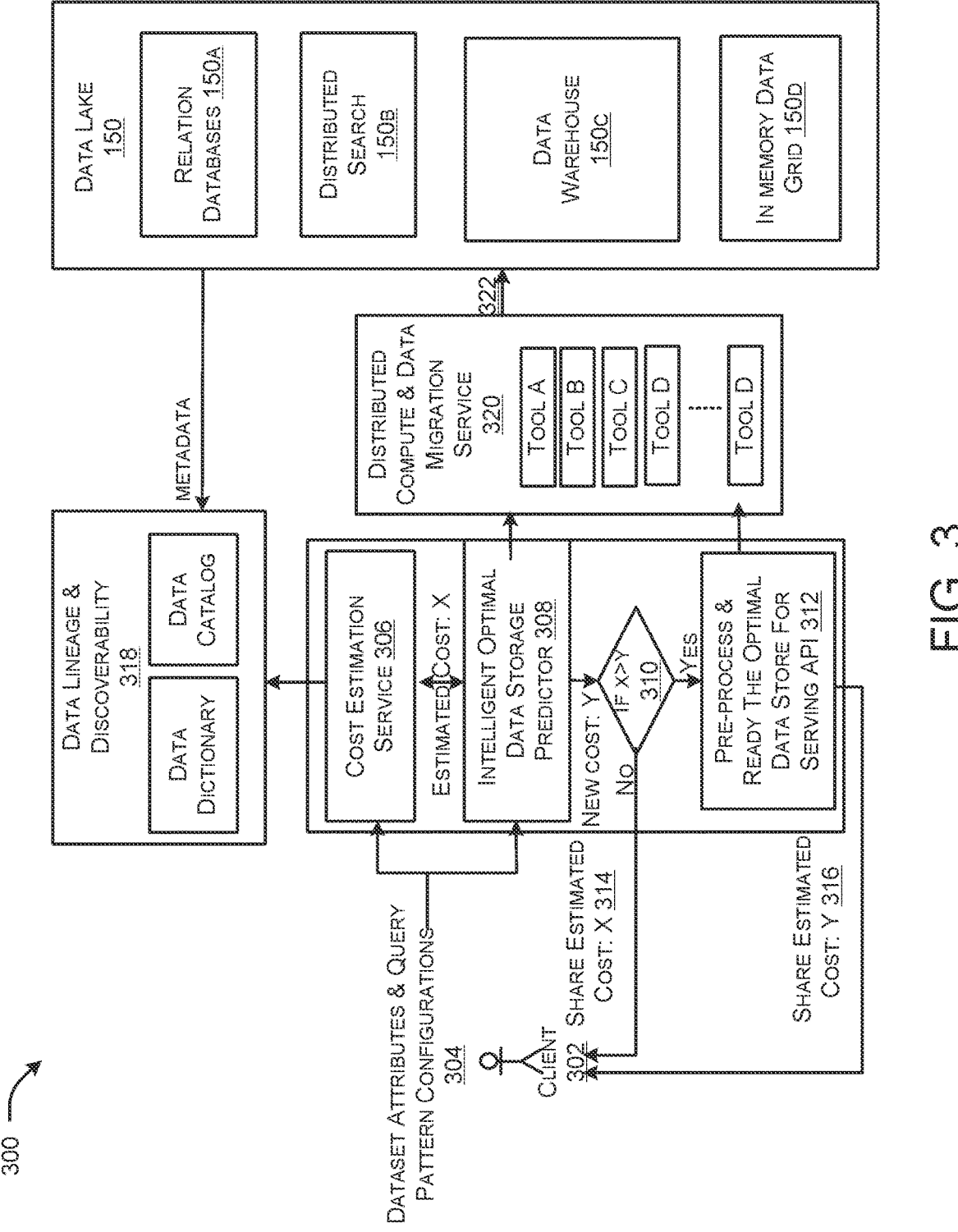
FIG. 3 illustrates an example block diagram (300) for implementing cost-optimized data source handling for a data access query pattern, in accordance with an embodiment of the present disclosure.

FIG. 3 illustrates an exemplary block diagram (300) for implementing cost-optimized data source handling for a data access query pattern, in accordance with an embodiment of the present disclosure.

Referring to FIG. 3, a data API cost estimation and optimization service may take query pattern definition parameters and the dataset attributes as an input to perform the steps described below via a system (110), i.e., a data access API platform:

a. Computes the cost of a use-case API for serving the user (302). The cost may be directly proportional to an amount of system resources. The resources may include, but not limited to, CPU, RAM, a disk, a network bandwidth, or the like, which may be utilized in executing the query in the existing data source in the data lake (150).

b. Identifies an optimal data source from amongst the other existing data sources (150a, 150b, 150c, 150d) in the data lake (150) for the dataset(s) being queried based on a least cost incurred strategy, by the user (302) while still fulfilling the query access pattern parameter values. The least cost incurred strategy may be also known as a cost-based optimization strategy. If such an optimal route is available for the user (302), a new estimated cost and a data route may be returned back to the user (302). The new cost may be taken into consideration any implied cost of migrating the data from store A (existing) to store B (optimal) or the cost of hosting the migration.

Furthermore, a data migration service may be used to migrate relevant datasets or slices/snapshots of datasets, from one data source to another optimal data source based on the cost incurred for the user (302). Such migration may be implemented using any distributed compute engine or Extract, Transform, Load (ETL) tools which may be capable of performing data copy operations for the datasets across different data sources (150a, 150b, 150c, 150d).

In operation, at step 304, the user (302) may initiate the data attribute and query pattern configuration. At step 306, based on the data attribute and query pattern configuration, the system (110) may perform cost estimation and predict an estimated cost X. Further, the system (110) may identify an optimal data source based on the data attribute and query pattern configuration using an optimal data storage predictor.

At step 308, based on the optimal data source, the system (110) may predict a new estimated cost Y. At step 310, the system (110) determines if the estimated cost X appears to be greater than the estimated cost Y. At step 312, if the estimated cost X appears to be greater than the estimated cost Y, the system (110) may pre-process the optimal data source and keeps the optimal data source ready for serving the API platform. Further, at step 316, if the estimated cost X appears to be greater than the estimated cost Y, the system (110) may share the estimated cost Y with the user (302). At step 314, if the estimated cost X appears to be lesser than the estimated cost Y, the estimated cost X may be shared with the user (302).

At step 318, the system (110) may perform data lineage and discoverability service in response to the cost estimation. At step 320, the system (110) may perform distributed computation and data migration service. At step 322, the system (110) may access data or datasets from the data lake (150).

Figure 4:
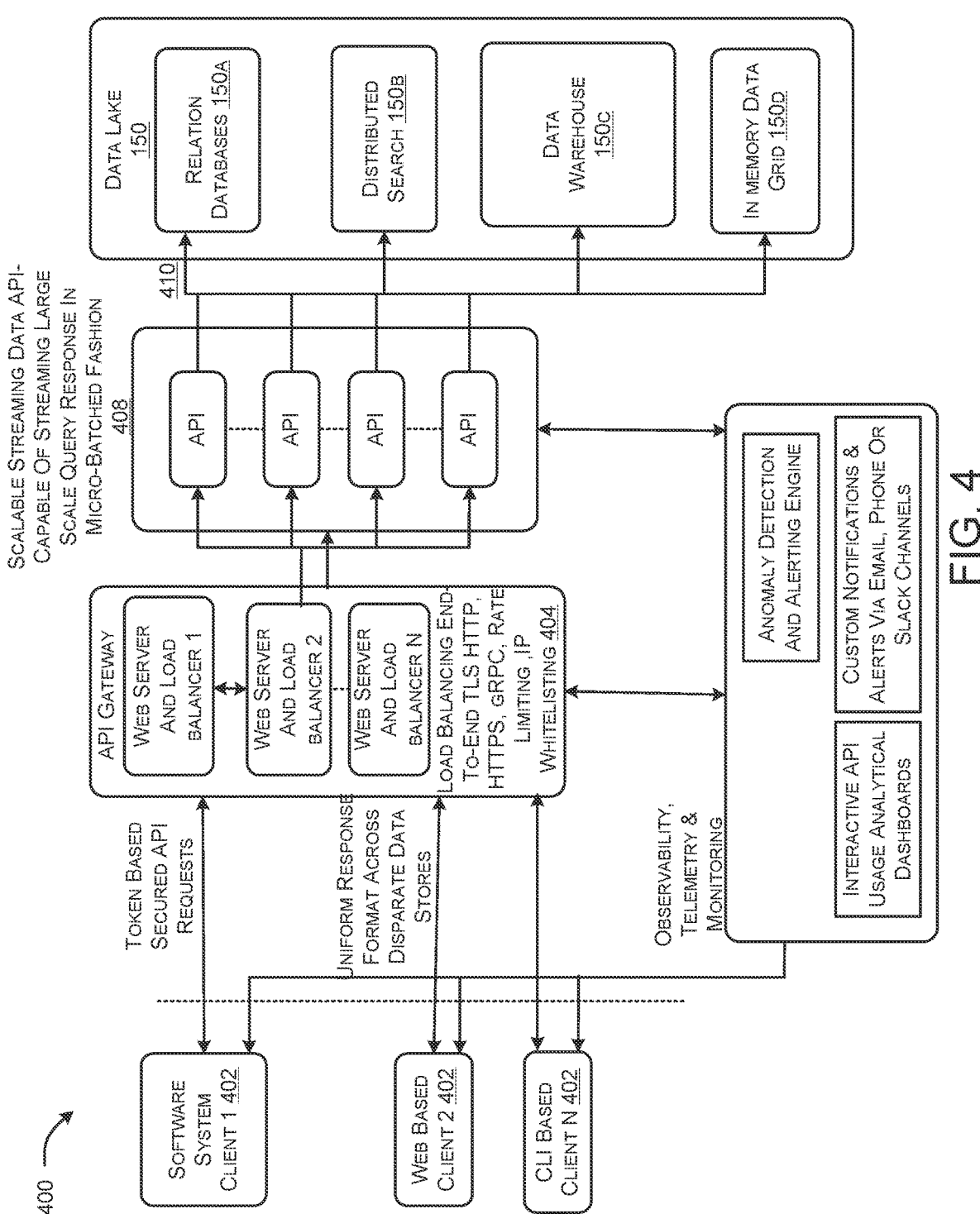
FIG. 4 illustrates an example block diagram (400) of a scalable data streaming API with advanced metering and monitoring functions, in accordance with an embodiment of the present disclosure

FIG. 4 illustrates an exemplary block diagram (400) of a scalable data streaming API with advanced metering and monitoring functions, in accordance with an embodiment of the present disclosure.

Referring to FIG. 4, an API gateway may be defined as an entry point for all incoming data access API requests. Primary responsibilities of the API gateway may include, without limitation, load balancing and traffic spikes handling, end-to-end Transport Layer Security (TLS), support for multiple protocols, such as Hypertext Transfer Protocol (HTTP), Hypertext Transfer Protocol Secure (HTTPS), remote procedure calls (gRPC), rate-limiting, Internet Protocol (IP)-whitelisting, and the like.

Further, a data streaming service may be performed using a scalable data streaming API which is capable of streaming large-scale datasets in response to client queries in a micro-batched fashion. Some of the salient features of the data streaming service may include:

a. Open query interface to inject an input query based on analysis done in the data exploration and discovery phase, b. Data store agnostic uniform API response format, c. Multiple response formats supported for rendering the response in JavaScript Object Notation (JSON) or Comma-Separated Values (CSV), d. Scalability may be ensured using advanced HTTP, i.e., streams based micro-batched implementation which may allow easy serving of very large-scale dataset response from the data lake (150) while utilizing minimal system resources such as CPU, memory, or disks.

e. Data streaming from the data source to a client application may be achieved by keeping a database cursor open while querying the data and serving back the response to the user (402) in a chunked transfer fashion as it streams from the data-source.

f. Custom real-time data-stream metrics may be embedded in the API service, to ease tracking of data flows across different users/clients (402) and their anomalies and take corrective actions in case of issues.

Furthermore, observability, telemetry, and monitoring may be performed to capture real-time rich metrics from the data streaming API and the API gateway, to provide deep meaningful insights for the usage of the API service by different clients/users (402) or tenant applications. These insights may allow the system (110) to answer in near real time, important operational and diagnostic questions such as:

a. Who are the existing users of the API?

b. For any given client, over a period of time, how many requests have been made?

c. For any given client, over a period of time, breakdown of the requests into different types of responses such as success, server level failure in query execution, unauthorized access, or the like.

d. For any given client, over a period of time, how much of response has been streamed back to the client?

e. For any given client, over a period of time, what is the mean response time for requests submitted?

f. For any given client, over a period of time, how much of data unit volumes—in terms of size in bytes and number of records, are being streamed?

g. Are there any anomalies in the usage pattern?

In operation, at step 404, multiple users/clients (402) may interact with an API gateway. At steps 404, 406, and 408, observability, monitoring, and telemetry of data may be performed via the API gateway or scalable streaming data API, respectively. At step 410, the data between all the services and modules may be exchanged from the data lake (150).

Figure 5A:
FIG. 5A illustrates a graphical representation (500A) of an example metering dashboard for record count mean per user, in accordance with an embodiment of the present disclosure.
Figure 5A:
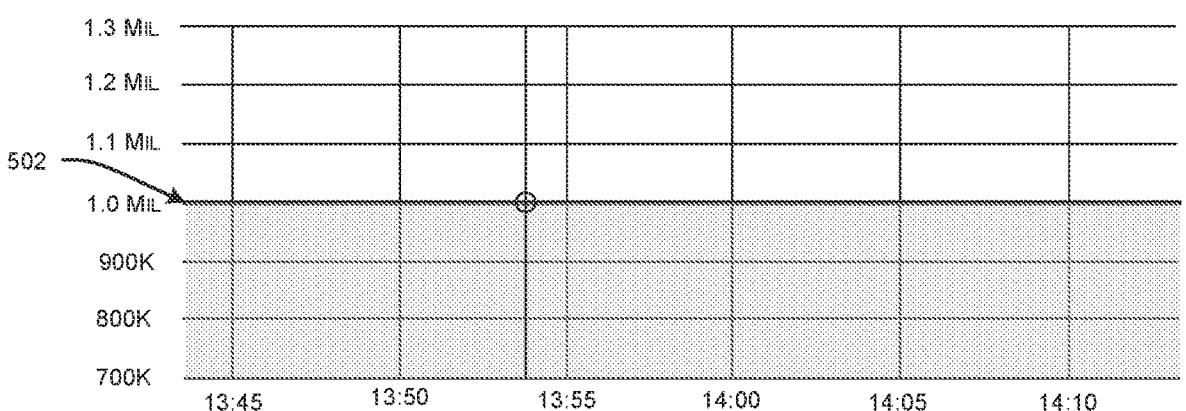
Figure 5B:
FIG. 5B illustrates a graphical representation (500B) of an example metering dashboard for response size mean per user, in accordance with an embodiment of the present disclosure.
Figure 5B:
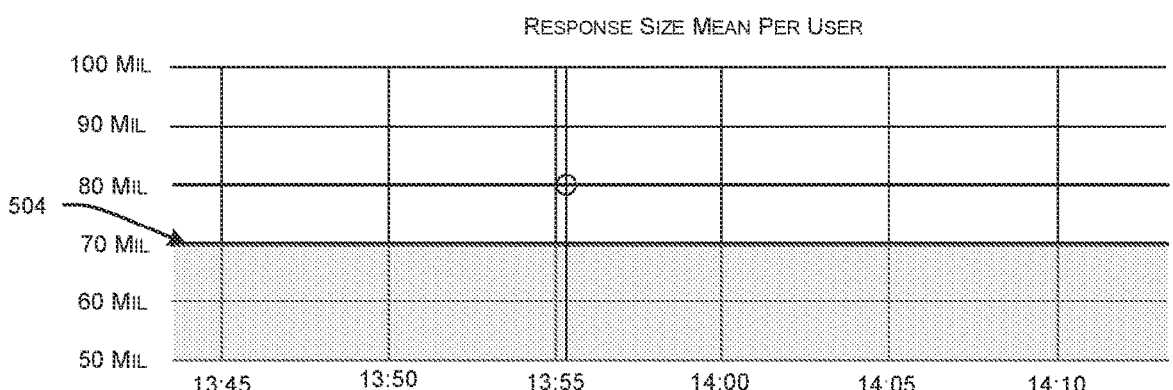

FIGS. 5A and 5B illustrate graphical representations (500A, 500B) of an example metering dashboard for record count mean per user and response size mean per user, in accordance with an embodiment of the present disclosure.

With reference to FIGS. 5A and 5B, monitoring may be performed automatically to capture real-time rich metrics from the data streaming API and the API gateway. Notification engines may trigger alerts based on custom threshold values around the metrics which may be both on a client usage level and on an API service. Graph 502 in FIG. 5A depicts a mean of the record count per user, and the graph 504 in FIG. 5B depicts a mean of the response size served per user.

The system (110) may perform visualization, notification, monitoring, and alerting operations using any of an open-source systems monitoring and alerting toolkit.

In addition, the system (110) may perform security service to enable the entire data flow from the data sources to an end client application to be end-to-end secured, using HTTPS with TLS. Authentication and authorization may be implemented at the data source level using different mechanisms, active directory (AD) group-based access controls, database schema level security for RDBMS systems, and vault based secure credentials for in-memory data sources.

Figure 6:
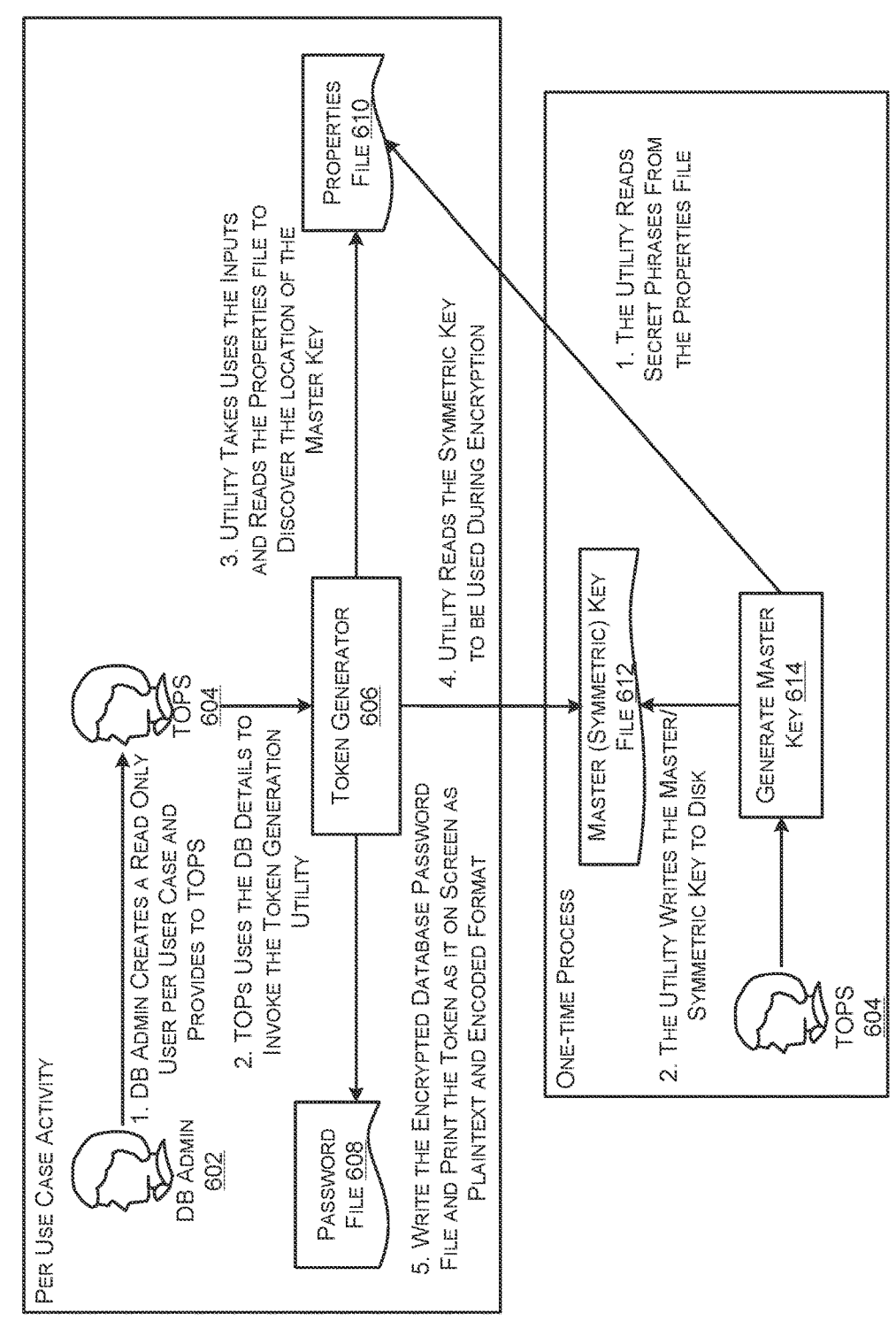
FIG. 6 illustrates an example block diagram (600) for implementing token generation in a relational database management system (RDBMS), in accordance with an embodiment of the present disclosure.

FIG. 6 illustrates an exemplary block diagram (600) for implementing token generation in a relational database management system (RDBMS), in accordance with an embodiment of the present disclosure.

Data access may be secured using secure access tokens that the clients may be provided once they are on-boarded with specific READ_ONLY (i.e., unauthorized may not be able to make any changes on the data source) privileges. These tokens may be rotated at periodic intervals.

Referring to FIG. 6, during a per use case activity, a database admin (602) may create a read only user per user case and may provide the read only user per user case to technical operators (TOPS) (604). The TOPS (604) may use the database details received from the database admin (602) to invoke a token generation utility. Further, the token generation utility may take the inputs from the database admin (602) and may read a properties file (610) to discover a location of a master key file. Consequently, the token generation utility may read a symmetric key to be used during the encryption. Further, a token generator (606) may generate a password file (608) which may be an encrypted database password file. The token generator (606) may write the encrypted database password file and print a token on a screen in a form of plain text and in an encoded format.

During a one-time process, the TOPS (604) may initiate generation of the master/symmetric key (612). A generate master key command (614) may be used to generate the master/symmetric key (612). The token generation utility may utility may read secret phases from the properties file (610) and writes the master/symmetric key (612) to the disk.

Figure 7:
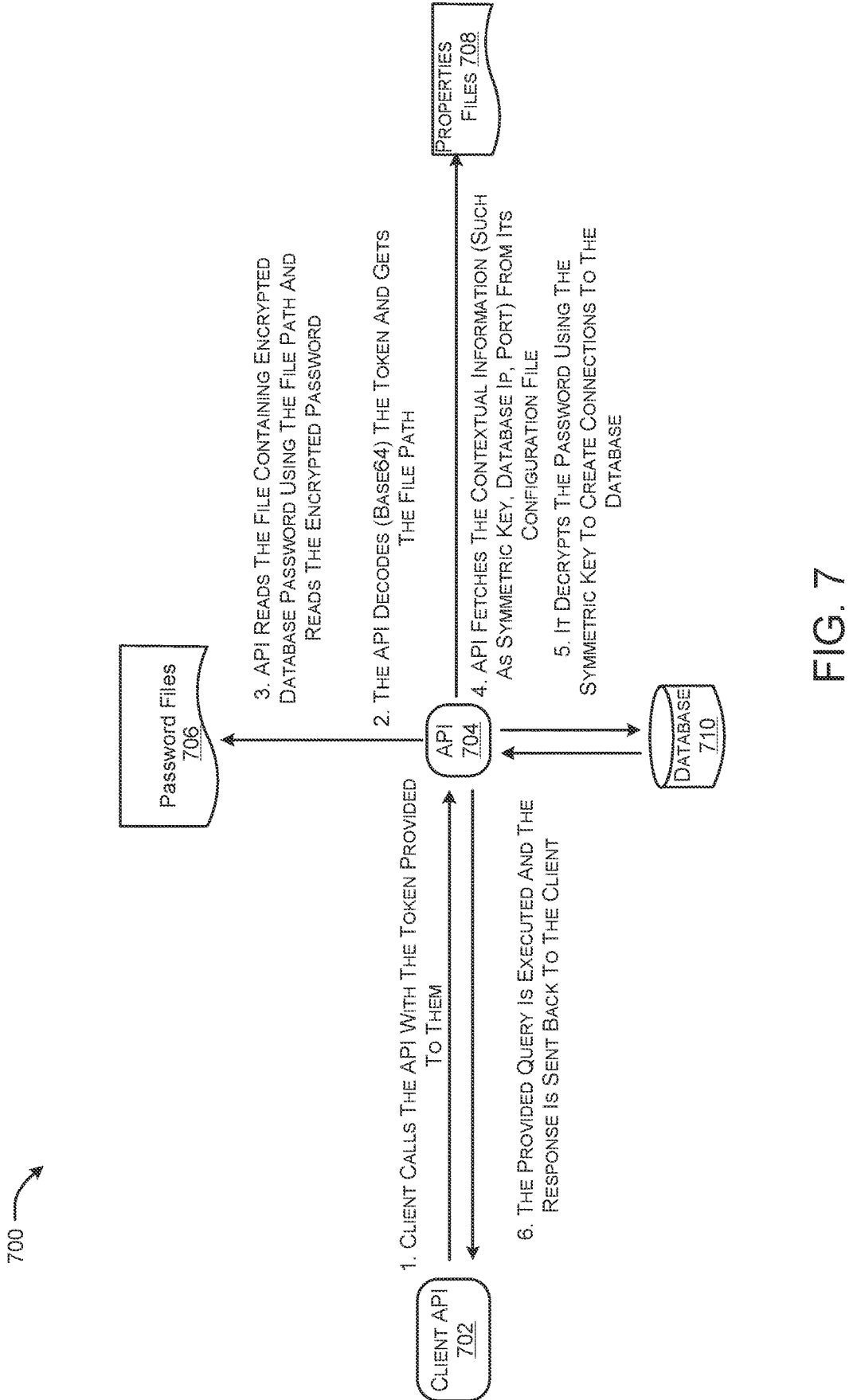
FIG. 7 illustrates an example flow diagram (700) for implementing a secured API call flow, in accordance with an embodiment of the present disclosure.

FIG. 7 illustrates an exemplary flow diagram (700) for implementing a secured API call flow, in accordance with an embodiment of the present disclosure.

Referring to FIG. 7, a client API (702) may call an API (704) when a token is provided to the client API (702). Further, the API (704) may decode the token and may get an encrypted password file path. Subsequently, the API (704) may read a password file (706) containing an encrypted database password using the file path and may read the encrypted password using the symmetric key. Furthermore, the API (704) may read the password file (706) containing the encrypted database password using the file path and may read the encrypted password.

Further, the API (704) may fetch the contextual information from a configuration file (708). The API (704) may further decrypt the password file (706) using the symmetric/master key to create a connection to a database (710).

Figure 8:
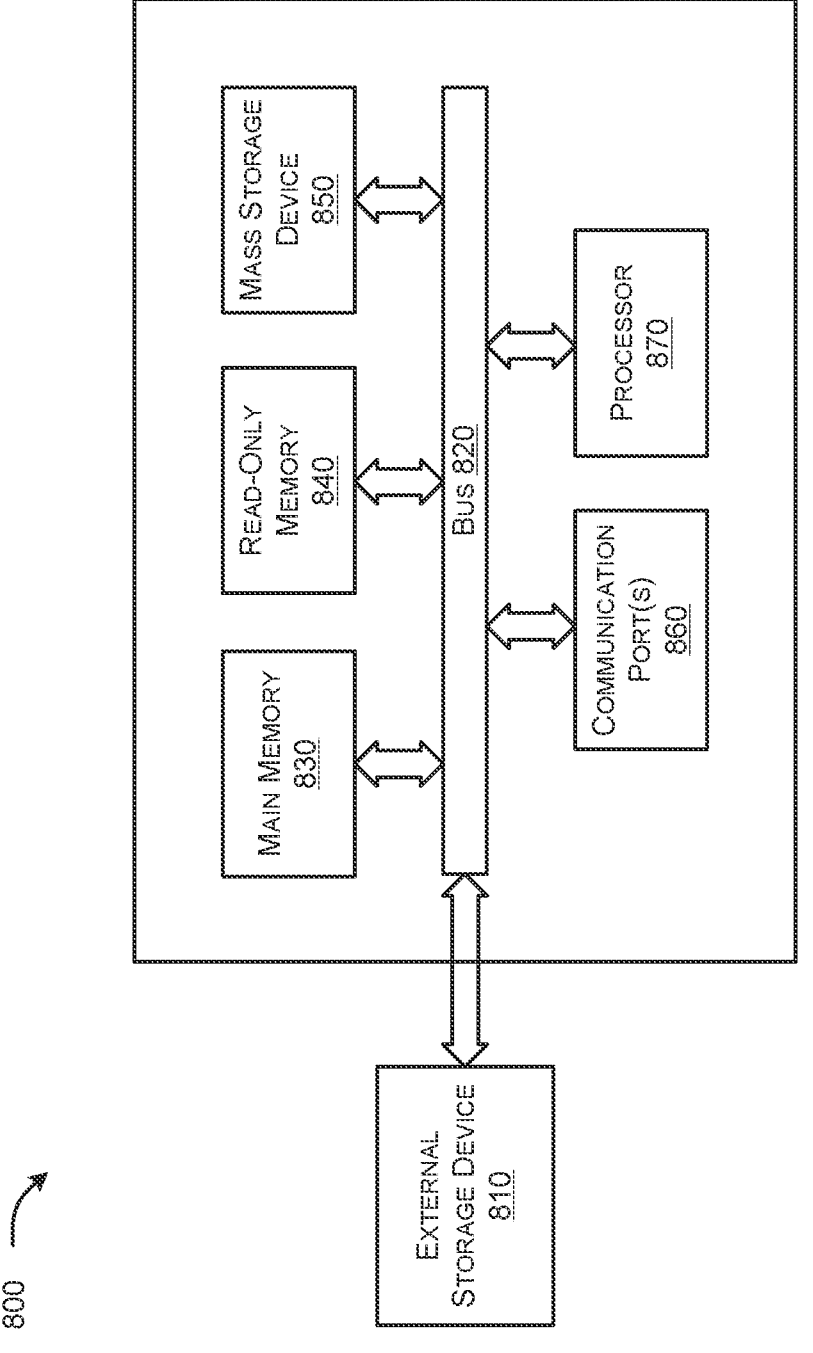
FIG. 8 illustrates an example computer system (800) in which or with which embodiments of the present disclose may be utilized in accordance with embodiments of the present disclosure.

FIG. 8 illustrates an exemplary computer system (800) in which or with which embodiments of the present disclose may be utilized in accordance with embodiments of the present disclosure.

As shown in FIG. 8, the computer system (800) may include an external storage device (810), a bus (820), a main memory (830), a read-only memory (840), a mass storage device (850), a communication port(s) (860), and a processor (870). A person skilled in the art will appreciate that the computer system (800) may include more than one processor (870) and communication ports (860). The processor (870) may include various modules associated with embodiments of the present disclosure. The communication port(s) (860) may be any of an RS-232 port for use with a modem-based dialup connection, a 10/100 Ethernet port, a Gigabit or 10 Gigabit port using copper or fiber, a serial port, a parallel port, or other existing or future ports. The communication ports(s) (860) may be chosen depending on a network, such as a Local Area Network (LAN), Wide Area Network (WAN), or any network to which the computer system (800) connects.

In an embodiment, the main memory (830) may be Random Access Memory (RAM), or any other dynamic storage device commonly known in the art. The read-only memory (840) may be any static storage device(s) e.g., but not limited to, a Programmable Read Only Memory (PROM) chip for storing static information e.g., start-up or basic input/output system (BIOS) instructions for the processor (870). The mass storage device (850) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces).

In an embodiment, the bus (820) may communicatively couple the processor(s) (870) with the other memory, storage, and communication blocks. The bus (1020) may be, e.g., a Peripheral Component Interconnect PCI)/PCI Extended (PCI-X) bus, Small Computer System Interface (SCSI), USB, or the like, for connecting expansion cards, drives, and other subsystems as well as other buses, such a front side bus (FSB), which connects the processor (870) to the computer system (800).

In another embodiment, operator and administrative interfaces, e.g., a display, keyboard, and cursor control device may also be coupled to the bus (820) to support direct operator interaction with the computer system (800). Other operator and administrative interfaces can be provided through network connections connected through the communication port(s) (860). Components described above are meant only to exemplify various possibilities. In no way should the aforementioned exemplary computer system (800) limit the scope of the present disclosure.

While considerable emphasis has been placed herein on the preferred embodiments, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter is to be implemented merely as illustrative of the disclosure and not as a limitation.

Advantages of the Invention

The present disclosure provides a system (for example, a uniform data access web Application Programming Interface (API) platform) and a method for accessing data or datasets across multiple data sources in a big data ecosystem.

The present disclosure provides a uniform data access web API platform for a big data ecosystem and a data lake with a standardized data response format.

The present disclosure provides a system that serves high volume, near real-time, data insights spread across different kinds of data stores to clients in a uniform, data-store agnostic fashion with high concurrency requirements in a secured, metered and monitored manner.

The present disclosure provides a system that enables client applications to be transparently aware of the cost incurred, beforehand, in using the data access API, and gives them an opportunity to optimize the cost further, by providing a cost-optimal route in serving the data insights from a data lake.

The present disclosure provides a system that transparently communicates the cost incurred in fulfilling the client API requests to the clients based on dataset attributes and query pattern attributes.

The present disclosure provides a system that implements a least cost incurred strategy to reduce the incurred cost for the client.

The present disclosure provides a system that provides a cost optimal route to reduce the cost incurred for a client query pattern by internally curating and customizing dataset footprint and storage.

The present disclosure provides a system that improves stability of various data source services and a data lake as a whole.

We claim:

1. A system for accessing datasets across a plurality of data sources, the system comprising:

a processor; and a memory operatively coupled with the processor, wherein said memory stores instructions which, when executed by the processor, cause the processor to:

receive, from a user device associated with a user, a query to fetch at least one dataset from at least one data source;

in response to receiving the query, send a list comprising a plurality of parameters to the user device;

receive datasets of interest, identified from the list by the user, and a query pattern defined based on a user requirement from the user device;

predict an estimated cost for the datasets of interest and identify an optimal data source corresponding to the datasets of interest based on the query pattern;

send the estimated cost to the user device;

migrate one or more datasets or slices of the one or more datasets from one data source to another optimal data source based on a cost incurred by the user;

predict, in response to the migration, a new estimated cost that comprises a cost for hosting the migration; and pre-process the optimal data source and provide access to the user device to fetch the datasets of interest from the optimal data source based on a positive response being received from the user device.

2. The system as claimed in claim 1, wherein the plurality of parameters comprises at least one of: existing datasets, data sources corresponding to the existing datasets, and a plurality of attributes corresponding to the existing datasets.

3. The system as claimed in claim 2, wherein the plurality of attributes comprises at least one of: a size of each dataset, a volume of each dataset, recency of each dataset, a velocity of each dataset, and security associated with each dataset.

4. The system as claimed in claim 1, wherein the estimated cost is directly proportional to an amount of one or more resources of the system, and wherein the one or more resources comprise at least one of: a Central Processing Unit (CPU), a Random-Access Memory (RAM), a disk, and a network bandwidth utilized in executing the query pattern.

5. The system as claimed in claim 1, wherein the optimal data source is identified based on a least cost incurred method.

6. The system as claimed in claim 1, wherein the memory comprises processor-executable instructions, which on execution, cause the processor to stream large-scale data sets from the at least one data source to the user device based on the query pattern via a scalable data streaming Application Programming Interface (API).

7. The system as claimed in claim 1, wherein the processor is to provide access to the user device by being configured to:

receive an input associated with the query pattern from the user device;

identify a location of the optimal data source based on the input;

generate a token with a password based on the identified location, wherein the password is encrypted using a symmetric key; and encode and send the token with the encrypted password to the user device to provide access to the user device.

8. The system as claimed in claim 1, wherein the memory comprises processor-executable instructions, which on execution, cause the processor to:

receive an encoded token with an encrypted password from the user device;

decode the encoded token and identify a location of the optimal data source based on the decoded token;

read and decrypt the encrypted password using a symmetric key; and in response to decrypting the encrypted password, establish a connection between the optimal data source and the user device to stream the datasets of interest from the optimal data source to the user device.

9. A method for accessing datasets across a plurality of data sources, the method comprising:

receiving, by a processor associated with a system, from a user device associated with a user, a query to fetch at least one dataset from at least one data source;

in response to receiving the query, sending, by the processor, a list comprising a plurality of parameters to the user device;

receiving, by the processor, datasets of interest, identified from the list by the user, and a query pattern defined based on a user requirement from the user device;

predicting, by the processor, an estimated cost for the datasets of interest and identifying an optimal data source based on the query pattern;

sending, by the processor, the estimated cost to the user device;

migrating, by the processor, one or more datasets or slices of the one or more datasets from one data source to another optimal data source based on a cost incurred by the user;

predicting, by the processor, a new estimated cost in response to the migration, wherein the new estimated cost comprises a cost for hosting the migration; and pre-processing, by the processor, the optimal data source and providing access to the user device to fetch the datasets of interest from the optimal data source based on a positive response being received from the user device.

10. The method as claimed in claim 9, wherein the estimated cost is directly proportional to an amount of one or more resources of the system, and wherein the one or more resources comprise at least one of: a Central Processing Unit (CPU), a Random-Access Memory (RAM), a disk, and a network bandwidth utilized in executing the query pattern.

11. The method as claimed in claim 9, wherein the optimal data source is identified based on a least cost incurred method.

12. The method as claimed in claim 9, comprising streaming, by the processor, large-scale data sets from the at least one data source to the user device based on the query pattern via a scalable data streaming Application Programming Interface (API).

13. The method as claimed in claim 9, wherein providing the access to the user device comprises:

receiving, by the processor, an input associated with the query pattern from the user device;

identifying, by the processor, a location of the optimal data source based on the input;

generating, by the processor, a token with a password based on the identified location, wherein the password is encrypted using a symmetric key; and encoding and sending, by the processor, the token with the encrypted password to the user device to provide access to the user device.

14. The method as claimed in claim 9, comprising:

receiving, by the processor, an encoded token with an encrypted password from the user device;

decoding, by the processor, the encoded token and identifying a location of the optimal data source based on the decoded token;

reading and decrypting, by the processor, the encrypted password using a symmetric key; and in response to decrypting the encrypted password, establishing, by the processor, a connection between the optimal data source and the user device to stream the datasets of interest from the optimal data source to the user device.

15. A user equipment (UE), comprising:

a processor; and a memory operatively coupled to the processor, wherein the memory comprises processor-executable instructions, which on execution, cause the processor to:

send a query to fetch at least one dataset from at least one data source to a system;

receive a list comprising a plurality of parameters from the system;

identify datasets of interest from the list and define a query pattern based on a user requirement;

send the query pattern to the system;

receive an estimated cost for the datasets of interest from the system based on the query pattern; and send a response to the system based on the estimated cost, wherein the processor is communicatively coupled to the system, and wherein the system is configured to:

send the list comprising the plurality of parameters to the UE in response to receiving the query;

predict the estimated cost for the datasets of interest and identify an optimal data source based on the query pattern;

migrate one or more datasets or slices of the one or more datasets from one data source to another optimal data source based on a cost incurred by the user;

predict, in response to the migration, a new estimated cost that comprises a cost for hosting the migration; and pre-process the optimal data source and provide access to the UE to fetch the datasets of interest from the optimal data source based on a positive response being received from the UE.

16. A non-transitory computer-readable medium comprising processor-executable instructions that cause a processor to:

receive, from a user device associated with a user, a query to fetch at least one dataset from at least one data source;

in response to receiving the query, send a list comprising a plurality of parameters to the user device;

receive datasets of interest, identified from the list by the user, and a query pattern defined based on a user requirement from the user device, predict an estimated cost for the datasets of interest and identify an optimal data source based on the query pattern;

send the estimated cost to the user device;

migrate one or more datasets or slices of the one or more datasets from one data source to another optimal data source based on a cost incurred by the user;

predict, in response to the migration, a new estimated cost that comprises a cost for hosting the migration; and pre-process the optimal data source and provide access to the user device to fetch the datasets of interest from the optimal data source based on a positive response being received from the user device.

\* \* \* \* \*